United States Patent
Stube et al.

(10) Patent No.: US 12,016,351 B2
(45) Date of Patent: Jun. 25, 2024

(54) CRISPED PROTEINACEOUS FOOD PRODUCT

(71) Applicant: MICHAEL FOODS, INC., Minnetonka, MN (US)

(72) Inventors: Alicia Stube, Chaska, MN (US); Noel G. Rudie, Chaska, MN (US)

(73) Assignee: MICHAEL FOODS, INC., Minnetonka, MN (US)

( * ) Notice: Subject to any disclaimer, the term of this patent is extended or adjusted under 35 U.S.C. 154(b) by 180 days.

(21) Appl. No.: 17/290,222

(22) PCT Filed: Oct. 29, 2019

(86) PCT No.: PCT/US2019/058655
§ 371 (c)(1),
(2) Date: Apr. 29, 2021

(87) PCT Pub. No.: WO2020/092432
PCT Pub. Date: May 7, 2020

(65) Prior Publication Data
US 2022/0015388 A1    Jan. 20, 2022

Related U.S. Application Data

(60) Provisional application No. 62/752,770, filed on Oct. 30, 2018.

(51) Int. Cl.
*A23J 3/26* (2006.01)
*A23J 3/04* (2006.01)
(Continued)

(52) U.S. Cl.
CPC . *A23J 3/26* (2013.01); *A23J 3/04* (2013.01); *A23L 15/20* (2016.08); *A23L 29/212* (2016.08)

(58) Field of Classification Search
CPC ..... A23J 3/26; A23J 3/04; A23L 15/20; A23L 29/212
(Continued)

(56) References Cited

U.S. PATENT DOCUMENTS 3,814,824 A    6/1974  Bedenk et al.
4,338,340 A    7/1982  Morimoto et al.
(Continued)

FOREIGN PATENT DOCUMENTS

EP    2020875 B1    12/2014
GB    2580311 A     7/2020
(Continued)

OTHER PUBLICATIONS

International Search Report and Written Opinion issued in Corresponding PCT Application No. PCT/US2019/058655, dated Feb. 6, 2020.
(Continued)

*Primary Examiner* — Brent T O'Hern
(74) *Attorney, Agent, or Firm* — Norton Rose Fulbright US LLP

(57) ABSTRACT

A crisp proteinaceous food product in which egg white proteins constitute the majority of total proteins present is described. The food product has a bulk density of from 120 to ~500 g/L and includes water, expanded starch, and denatured proteins. Ovalbumin constitutes at least 33% (w/w) of the proteins. Expanded starch can constitute at least 35% (w/w) of the food product.

22 Claims, 1 Drawing Sheet

(51) Int. Cl.
*A23L 15/00* (2016.01)
*A23L 29/212* (2016.01)

(58) Field of Classification Search
USPC ............................................. 426/516
See application file for complete search history.

(56) References Cited

U.S. PATENT DOCUMENTS

| | | | |
|---|---|---|---|
| 4,418,086 A | 11/1983 | Marino et al. |
| 4,517,204 A | 5/1985 | Mottur et al. |
| 4,840,808 A | 6/1989 | Lee et al. |
| 5,034,232 A | 7/1991 | Sugitani et al. |
| 5,124,168 A | 6/1992 | McMillin et al. |
| 5,147,665 A | 9/1992 | Furcsik |
| 5,283,077 A | 2/1994 | Ray |
| 5,435,714 A | 7/1995 | van Lengerich et al. |
| 5,639,485 A | 6/1997 | Weinstein et al. |
| 5,922,387 A | 7/1999 | Parada et al. |
| 5,989,620 A | 11/1999 | Wang et al. |
| 6,016,742 A | 1/2000 | Hauck et al. |
| 6,045,851 A | 4/2000 | Cross |
| 6,203,840 B1 | 3/2001 | Meyer et al. |
| 6,541,059 B2 | 4/2003 | Oh et al. |
| 6,569,483 B2 | 5/2003 | Zohoungbogbo |
| 6,596,331 B1 | 7/2003 | Nobuyasu et al. |
| 7,235,276 B2 | 6/2007 | Allen et al. |
| 7,597,921 B2 | 10/2009 | Walsh et al. |
| 8,293,297 B2 | 10/2012 | Orcutt et al. |
| 8,637,105 B2 | 1/2014 | Kou et al. |
| 8,790,731 B2 | 7/2014 | O'Connor et al. |
| 9,034,402 B2 | 5/2015 | Wong et al. |
| 9,370,200 B2 | 6/2016 | Gibbons et al. |
| 9,924,734 B2 | 3/2018 | Burke et al. |
| 10,039,306 B2 | 8/2018 | Vrljic et al. |
| 10,188,117 B2 | 1/2019 | Okazawa et al. |
| 10,631,555 B2 | 4/2020 | Barnvos et al. |
| 10,681,931 B2 | 6/2020 | Ford et al. |
| 10,863,761 B2 | 12/2020 | Brown et al. |
| 2005/0064079 A1* | 3/2005 | Allen .................... A23K 50/42 |
| | | | 426/549 |
| 2005/0089623 A1 | 4/2005 | Fannon |
| 2005/0202143 A1 | 9/2005 | Roy et al. |
| 2008/0102165 A1 | 5/2008 | Ning et al. |
| 2008/0248167 A1 | 10/2008 | McMindes et al. |
| 2008/0254167 A1 | 10/2008 | McMindes et al. |
| 2008/0254168 A1 | 10/2008 | Mueller et al. |
| 2009/0123629 A1 | 5/2009 | Chang et al. |
| 2009/0220674 A1 | 9/2009 | Katz et al. |
| 2010/0136201 A1 | 6/2010 | Bigeard et al. |
| 2011/0142999 A1 | 6/2011 | Wind et al. |
| 2011/0257087 A1 | 10/2011 | Krul et al. |
| 2013/0022731 A1 | 1/2013 | Olson |
| 2013/0122164 A1 | 5/2013 | Montelongo et al. |
| 2013/0331315 A1 | 12/2013 | Krul et al. |
| 2014/0065285 A1 | 3/2014 | Alden |
| 2014/0106050 A1 | 4/2014 | Kou et al. |
| 2014/0154395 A1 | 6/2014 | Alden |
| 2014/0220225 A1 | 8/2014 | Alden |
| 2015/0296834 A1 | 10/2015 | Geistlinger |
| 2015/0374014 A1 | 12/2015 | Gumudavelli et al. |
| 2018/0355020 A1 | 12/2018 | Anchel |
| 2020/0060310 A1 | 2/2020 | Schmidt et al. |
| 2020/0138066 A1 | 5/2020 | Anchel |
| 2020/0329733 A1 | 10/2020 | Gibbons et al. |
| 2021/0251245 A1* | 8/2021 | Stessen ................ A21D 13/045 |

FOREIGN PATENT DOCUMENTS

| | | |
|---|---|---|
| WO | WO 2008/052343 | 5/2008 |
| WO | WO 2017/040610 | 3/2017 |
| WO | 2021034980 A1 | 2/2021 |

OTHER PUBLICATIONS

Office Action issued in Corresponding British Application No. GB2107521.3, dated May 12, 2022.

* cited by examiner

CRISPED PROTEINACEOUS FOOD PRODUCT

CROSS-REFERENCE TO RELATED APPLICATION

This application is a national stage entry of international application no. PCT/US2019/058655, filed 29 Oct. 2019, which claims the benefit of U.S. provisional patent application No. 62/752,770, filed 30 Oct. 2018, the disclosure of which is incorporated herein by reference.

BACKGROUND INFORMATION

Protein crisps have been prepared from dairy products and a variety of vegetables including soy, rice, peas, quinoa, sorghum, and the like. These crisped food items then get incorporated into snack bars, cereals, baked goods, etc.

In recent years, soy crisps have gained in popularity due to consumer demand for protein and snack bars and the relatively good bioavailability of soy protein. However, soy protein crisps often need to be masked with a strong flavor (e.g., chocolate and/or peanut butter) due to off flavors resulting from the presence of chemicals such as aldehydes, ketones, furans, n-alkanols, geosmin, and chlorogenic acid.

Avian eggs, particularly hen eggs, have been a food staple for centuries. Over time, different uses have manifested for egg whites and egg yolks. Egg white, also known as albumen, is the clear, alkaline liquid portion of the egg surrounding the egg yolk. It constitutes roughly two-thirds of a chicken egg by weight.

Egg white includes 10-12% (w/w) proteins. Slightly more than half of an egg's protein content, yet very little of its fat content and none of its cholesterol, is contained in the egg white. Advantageously, egg white is free of many of the organic compounds responsible for the aforementioned off flavors which must be masked with sugar or strongly flavored additives or coatings.

Nearly 150 egg white proteins have been identified including, for example, ovalbumin, ovotransferrin, ovomucoid, ovoglobulin G2 and G3, ovomucin, lysozyme, ovoinhibitor, ovoglycoprotein, flavoprotein, and ovomacroglobulin. By far, the most prevalent protein in egg white is ovalbumin.

Advantageously, egg white protein is highly bioavailable, much more so than the protein available from many other sources including, for example, soy.

However, the nature of the proteins in egg white have inhibited the use of these proteins in the production of the type of crisps described previously. If extrusion techniques commonly employed in the manufacture of soy protein crisps are used with egg white protein, the extruder becomes obstructed or, failing that, a texturized protein (rather than a crisp) results.

U.S. Pat. Publ. No. 2009/0220674 A1 describes an expanded food product made from egg whites. The resulting expanded food product is said to have a density of less than 100 g/L, which is far below that required for many end use applications such as, for example, protein and nutrition bars where expanded food products with more firmness and crispiness are employed.

That which remains desirable is an egg white protein crisp food product and a method for providing such as food product.

SUMMARY

Hereinafter is described a crisp proteinaceous food product in which egg white proteins constitute the majority of total proteins present.

In one aspect is provided a proteinaceous food product having a bulk density of from ~120 to ~500 g/L. The food product includes water, expanded starch, and denatured proteins. Ovalbumin constitutes at least 33% (w/w) of the proteins. In some embodiments, expanded starch can constitute at least 35% (w/w) of the food product.

In another aspect is provided a process for providing a proteinaceous food product having a crispy texture and a higher degree of firmness than that which previously could be obtained.

The proteinaceous product can be consumed as-is or can be used as an ingredient in a processed food item, e.g., a protein or nutrition bar.

Unless a portion of text specifically indicates otherwise, all percentages throughout this document are weight percentages, i.e., w/w.

The more detailed description and figures that follow provide additional details which explain and exemplify the aforedescribed processes. The appended claims define the inventions in which exclusive rights are claimed, and they are not intended to be limited to particular embodiments shown and described, from which ordinarily skilled artisans can envision variations and additional aspects.

DETAILED DESCRIPTION OF ILLUSTRATIVE EMBODIMENTS

Figure 1:
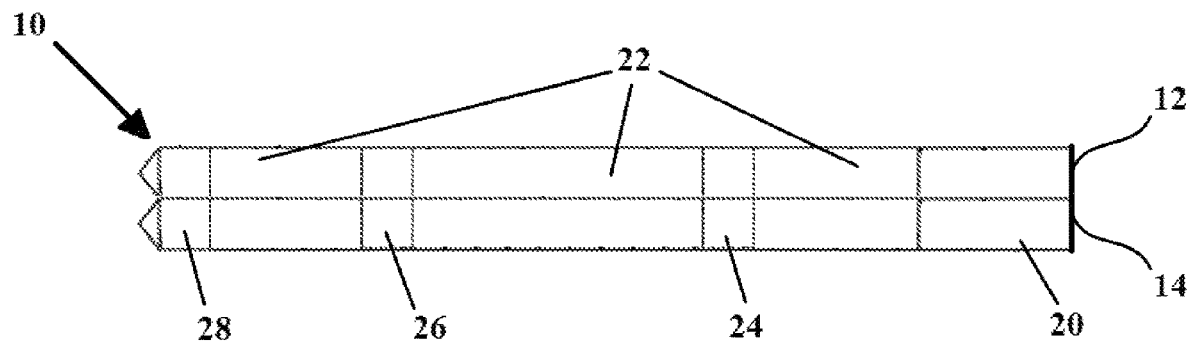
FIG. 1 depicts a simplified schematic representation of the screws from a twin screw extruder, not to scale with protecting barrel removed, which can be used in the production process described herein.

As summarily described above, described herein are high-protein extruded products and methods of making such extruded products. The extruded products are useful in that they present a protein-rich, even a high-protein, product in a form normally associated with high-carbohydrate products.

A high-protein product is one which provides at least 20% of the FDA daily value of that nutrient. Because that daily value in the case of protein is 50 g, a high-protein product needs to provide at least 10 g protein per serving. Medium-density (20-43 g/cup) breakfast cereals and many snacks (chips, snack mixes, extruded snacks, etc.) have a serving size of 30 g, meaning that they must be 33% (w/w) protein to be labeled as high-protein.

In the description that follows, a proteinaceous food product having a crispy texture is referred to as a crisp.

Processes and equipment used to make crisps from a variety of protein sources are known. Ingredients are fed into an extruder where they are mixed, wetted, heated under pressure, and forced through a die and cut. Many extruders are able to perform these steps so that little or no pre- or post-processing is required. Various parts that may be associated with the extruder can grind, hydrate, shear, homogenize, mix, compress, and de-gas the ingredients fed to the extruder.

The extrusion can include melting and/or plasticization of certain ingredients, gelatinization of starch and denaturation of proteins, with the necessary heat resulting from any of variety of sources such as steam injection, external heating of the extruder barrel, or inputted mechanical energy. By varying processing conditions and dies, extrusion can yield food products with little expansion (e.g., pasta), moderate expansion (e.g., shaped breakfast cereal, texturized soy (i.e., meat substitute), modified starches, pet food, etc.), or significant expansion (e.g., puffed cereal or snacks); crisps fall into the lattermost category.

When pressurized extrudate exits the extruder barrel and encounters reduced pressure and temperature, it expands and cools, resulting in a puffed product. The puffed product can be of different shapes and sizes, depending on the die through which it passes and the frequency with which it is cut. Subsequent drying can result in a food product moisture content of from ~1% to ~8%, preferably no more than 5%, and more preferably no more than 3%.

For additional information on the production of protein crisps, the interested reader is directed to any of a variety of publications including K. E. Allen et al., "Influence of protein level and starch type on an extrusion-expanded whey product," *Intl. J. Food Sci. and Technol.,* 42, 8, pp. 953-60 (2007), H. F. Conway et al., "Protein-Fortified Extruded Food Products," *Cereal Science Today,* 18, 4, pp. 94-97 (1973), and L. Yu et al., "Protein rich extruded products prepared from soy protein isolate-corn flour blends," *LWT Food Sci. Technol.,* 50:1, pp. 279-89 (2013); texts such as C. Mercier et al., *Extrusion Cooking* (Am. Assn. of Cereal Chemists, 1989) and L. Moscicki (ed.), *Extrusion-Cooking Techniques* (Wiley-VCH, 2011); and patent documents such as U.S. Pat. Publ. Nos. 2007/0077345, 2008/0102168, 2015/0296836 and the like.

Unfortunately, conditions employed to make crisps from the most widely used vegetable proteins (e.g., soy) do not yield crisps when egg proteins are used instead. Specifically, generally accepted processing conditions result in undesirable configuration and/or association of egg proteins in the extruder which prevents formation of a crisp. Knowledge gained from making soy protein crisps does not translate directly into the manufacture of egg protein crisps.

The ratio of primary dry ingredients, the amount of water added to the dry ingredients in the extruder, and the amount of energy (both thermal and mechanical) inputted into the mixture while it is in the extruder all impact the ability to obtain a proteinaceous food crisp product with the desired bulk density.

The paragraphs which follow describe one set of conditions which can be used with a twin-screw extruder to provide egg protein crisps. These exemplary conditions can be adjusted to account for available equipment and specific desired final product characteristics.

Dry ingredients preferably are mixed prior to introduction to the extruder. This typically occurs at or near ambient temperature. No special mixing equipment or techniques are required.

Two required dry ingredients are dried egg whites, preferably egg white powder, and starch.

Egg white powder is a form of dried egg whites, a food product which is regulatorily defined in the United States; see 21 C.F.R. § 160.145. Both dried egg whites generally and egg white powders specifically are commercially available from a variety of sources.

The second required dry ingredient, starch, can be derived from a variety of sources including, but not limited to, corn, rice, potatoes, wheat and tapioca. Alternatively, a food product that includes a large amount of starch, e.g., certain wheat and corn flours, can be used in place of or in addition to starch itself. Blends of different starches and/or starchy food products also are contemplated. The type of starch or starch-containing product can impact the organoleptic properties of the resulting extruded food product, and ordinarily skilled food chemists can adjust the choice and amount of various starches or starchy products accordingly.

The ratio of dried egg white (egg white powder) to starch(es) generally ranges from 1:3 to 3:1, often 1:2 to 2:1 and commonly from 2:3 to 3:2. In some embodiments, the amount of dried egg white (or egg white powder) constitutes at least 50% (w/w) of the sum of egg-based component(s) and starch(es). (The foregoing ingredient ratios and percentages apply to the final product as well.)

Additional dry ingredients can be included in the mixture and/or these can be added at a later stage of the process. Examples of additional dry ingredients include one or more other types of protein (including, but not limited to, protein derived from soy, casein, whey, peas, rice and wheat), GRAS food acids, flavorants such as sweeteners, spices and seasonings, texture modifiers (e.g., $CaCO_3$), minerals (e.g., $CaSO_4$, $Na_2CO_3$ and $K_2CO_3$), vitamins, mono- and diglycerides, lecithin, inulin, and fiber. The amounts of such additional dry ingredients can vary greatly, although less than 5% (w/w) preferably is employed. The dry ingredients typically have a light, fluffy, powder consistency.

The mixture of dry ingredients is fed into the extruder, typically by gravity from a hopper, although these ingredients optionally can be conveyed through a pre-conditioner, depending on the set up of the extrusion system. (During this conveyance, no water is added, i.e., the pre-conditioner is only a conveyance device.) Additional dry ingredients also be can be introduced to the extruder here (through separate ingredient feeders, if necessary), regardless of whether the same or other additional dry ingredients were included in the initial mixing step.

A simplified schematic representation of the screws from an exemplary extruder which can be used is shown in FIG. 1. Extruder 10 includes screws 12 and 14. (Depictions of flights have been omitted from the barrels for the sake of clarity, although an ordinarily skilled artisan understands how the zones described below employ flights of differing shapes, depths, frequency and the like.)

In the particular embodiment depicted in FIG. 1, each of screws 12 and 14 include the same sections, which is common. The reference numerals are shown in connection with only or the other of screws 12 and 14, although the ordinarily skilled artisan understands that the sections represented apply to both of screws 12 and 14.

Initial conveying section 20 acts to pull dry ingredients away from the feeder port and into the body of the extruder. To accomplish this type of conveyance at a sufficient rate, a long pitch configuration is preferred.

Water, as well as other optional liquids such as dyes, oils, and the like can be added in initial conveying section 20, very shortly after introduction of the dry ingredients. Pressurization of these liquids (or at least the water) permits introduction through a nozzle at an essentially constant addition rate. The liquid(s) need not be heated or chilled prior to introduction, although these possibilities are not excluded.

After initial conveying section 20, the depicted design includes forward conveying sections 22 separated by first kneading section 24 and second kneading section 26. The combination of these conveying and kneading sections preferably make up 65-85% of the lengths of screws 12 and 14. The ratio of conveying-to-kneading zone lengths typically is at least 2:1.

Use of cut screws, which permit backward slipping of solids, often result in crisps with unacceptable amounts of undesirable texturizing, and therefore are preferably avoided.

The dry ingredients are conveyed into and along the barrel, during which time they receive relatively low amounts of inputted mechanical energy, throughout the initial portions of screws 12 and 14, i.e., the conveying and kneading sections.

Distal section 28 of screws 12 and 14 pushes dough through, typically, cone screws. Both compression and final conveying occur here.

In view of the relatively moderate die temperature targets mentioned below and the natural temperature rise due to mechanical energy imparted by the screws, little-to-no heating of the barrel jacket is required. Each section of the surrounding barrel jacket typically is maintained at approximately room temperature, i.e., 15° to 30° C., and inputting of additional thermal energy from an outside source (e.g., hearing of the barrel jacket) typically is avoided. Later barrel sections can be heated slightly, but typically to no more than ~30° C., while the last barrel section preferably is maintained at below 30° C., typically ~25° C.

Despite the lack of thermal energy inputted from an external source, the extruded contents typically experience a temperature rise due to conversion of mechanical work to heat of from about room temperature in initial conveying section 20 to up to ~100° C. or so at distal section 28.

The ratio of screw length to inner diameter of the extruder barrel is at least 12, preferably at least 16, and most preferably at least 20.

The extruder screw speed can range from 200 to 600 rpm, with the specific speed depending largely on type and design of extruder and desired throughput. (Both the minimum and maximum speeds in the preceding sentence have a tolerance of ±10%.) As a point of comparison, processes employed to make soy crisps (i.e., crisps made from only or primarily soy proteins), typically employ a screw speed of no more than 120-130 rpm, commonly ~100 rpm.

Crisps with good organoleptic properties have been obtained, without plugging of the extruder, using on the order of 10-20% (w/v) water, e.g., 10-20 L water per 100 kg dry ingredients. Lower ratios (e.g., from ~2 to less than 10 L, typically less than 8 L, water per 100 kg dry ingredients) can be used to good effect, albeit at the risk of a less stable process where a slight variation in the tolerances runs the risk of plugging the extruder.

In the early stages of a given extrusion, the foregoing ratios can be upwardly adjusted, e.g., 25-100 L or 30-90 L or even 35-80 L water per 100 kg dry ingredients. As the extruder barrel fills and the temperature of its contents increases to ~80° C., the rate of liquid(s) introduction can be reduced so as to provide the aforementioned ratios.

The foregoing amounts of water are higher than those typically employed when making crisps from vegetable-based proteins; in other words, a higher level of moisture is required at the outset to start up the extruder and hydrate the proteins in the present process than is required in a similar process with vegetable proteins. When the extruder has reached a steady state, similar amounts of water may be used to get good expansion, although extrusion processes involving vegetable proteins are less likely to plug when lower amounts of water are used.

The ratio of liquid-to-dry inputs also impacts operating pressures, with higher ratios resulting in lower pressures and lower ratios resulting in higher pressures. An exemplary target extruder operating pressure range in the extruder is 10 to 12.5 MPa (~1500 to ~1800 psi), assuming that the equipment is rated for such pressures. This range applies to a wide range of extruders, including models manufactured by Wenger (Sabetha, Kansas) and Baker Perkins Ltd. (Peterborough, UK).

Temperature of material exiting the die preferably is at least ~100° C., more preferably at least ~105° C., and even more preferably at least ~110° C., but preferably no more than ~165° C., commonly no more than ~160° C., and typically no more than ~155° C. (Any of the foregoing minimums can be combined with any of the maximums to provide preferred ranges.)

Die sizes and shapes can vary according to the desired end shape and size of the protein crisp product. In practice, a larger diameter (e.g., 4 mm) die appears to correlate to slightly better texture and expansion, perhaps due to less constriction/shear of the material. Dies ranging from 0.5 mm slits to a 4.0 mm circles have produced acceptable products.

If no cutting device is used, extrudate emerges in the form of a rope.

Use of cutter segments the rope into the pieces and creates spheres, oblong cylinders, and the like. End-use application drives the form of the cutting device and its frequency.

Extrudate typically has a moisture content on the order of 10 to 25% (w/w), which is higher than desirable. Heating so as to remove moisture (drying) can reduce the moisture content to less than 5% (w/w) moisture, preferably no more than 4% (w/w), more preferably no more than 3% (w/w). If an oven is used for this drying step, its temperature can be maintained at 82°-93° C. (~190°±10° F.), which promotes dehydration rather than cooking.

Resulting protein crisps typically include, on a moisture free basis, from ~22.5 to ~55%, preferably ~24% to ~54%, and more preferably ~25% to ~52.5% protein and from ~25 to ~77%, preferably ~27.5% to ~75%, and more preferably ~30% to ~72.5% carbohydrate (all w/w). (The vast majority of the carbohydrates, and in some cases all of them, result from the aforementioned starch(es).) Ash always accounts for at least a small amount of mass in the final product, so pairing the respective ranges above for protein and carbohydrates typically do not result in a sum of 100%; nevertheless, any of the first set of ranges can be combined with any of the second set to provide combined percentage ranges, with the proviso that the sum of the two percentages cannot exceed 100%.

As points of comparison, typical values for a variety of protein crisps appear below in Table 1.

TABLE 1 common percentages of proteins and carbohydrates in crisps

| | Protein | Carbohydrate |
|---|---|---|
| Lentil | 25 | 63 |
| Pea | 27 | 72 |
| Corn | 8-9 | 86 |
| Rice | 6 | 88 |
| Milk (non-fat, dried) | 45-85 | 15-55 |
| Soy concentrate/isolate | 80-90 | 10-20 |
| Soy flour, full fat | 32-67 | 33-68 |
| Soy flour, low fat | 50 | 30 |

Advantageously, the aforedescribed process can yield a protein crisp where all or a substantial portion of the protein is egg protein. At least 33%, preferably at least 35%, more preferably at least 37.5%, even more preferably at least 40%, still more preferably at least 42.5%, yet still more preferably at least 45%, even still more preferably at least 47.5% and most preferably at least 50% (all w/w) of the proteins in the crisp is ovalbumin.

The aforedescribed process also produces a proteinaceous food product having a bulk density that is higher than that of the process described in U.S. Pat. Publ. No. 2009/0220674 A1. The resulting protein crisp has a bulk density of from ~120 to ~500 g/L.

Some end-use applications call for protein crisps with a particular bulk density, or at least a bulk density within a relatively narrow range. For example, many dry breakfast cereals have bulk densities in the range of 120 to 275 g/L, with some specialty cereals (e.g., muesli) being even higher, e.g., 350 to 400 g/L. Crunchy snacks often have bulk densities in the range of 130 to 190 g/L, while breadcrumbs are much higher (e.g., ~450 g/L). An extruded product intended for one such applications should have a corresponding bulk density value.

Advantageously, the aforedescribed process can provide protein crisps having bulk densities of at least 125, at least 130, at least 140, at least 150, at least 160, at least 170, at least 180, at least 190, at least 200, at least 210, at least 220, at least 225, at least 250, at least 275, at least 300, at least 325, at least 350, at least 375, at least 400, at least 425, at least 450, and at least 475 g/L. (Also contemplated are ranges that employ one of the foregoing minimums with another minimum that is higher than the first.) This range permits the resulting protein crisps to be tailored to match (or substitute for) a wide variety of currently employed food products.

Prior to use or packaging, dried crisps preferably are cooled to close to ambient temperature.

The foregoing description has employed certain terms and phrases for the sake of brevity, clarity, and ease of understanding; no unnecessary limitations are to be implied therefrom because such terms are used for descriptive purposes and are intended to be broadly construed.

The foregoing compositions and methods have been presented by way of example only. Certain features of the described compositions and methods may have been described in connection with only one or a few such compositions or methods, but they should be considered as being useful in other such compositions or methods unless their structure or use is incapable of adaptation for such additional use. Also contemplated are combinations of features described in isolation.

The relevant portion(s) of any patent or publication specifically mentioned in the foregoing description is or are incorporated herein by reference.

EXAMPLES

Bulk density of a solid food product can be measured by filling a vessel of known volume (e.g., beaker, measuring cup, etc.) with that product, ensuring that the product does not dome or tent over the top of the vessel (i.e., leveling the upper surface), measuring the weight of the food product, and dividing that weight by the known volume.

The foregoing procedure was used to compile egg protein crisps, made according to the production method set forth above, having a range of bulk densities. These products are set forth in Table 2.

TABLE 2

| tested protein crisps | |
|---|---|
| Sample | Bulk density (g/L) |
| 1 (comp.) | 90 |
| 2 | 150 |
| 3 | 175 |
| 4 | 220 |
| 5 | 280 |
| 6 | 340 |
| 7 | 410 |

Each of the egg protein crisps from Table 2 was analyzed for its texture properties, specifically, crispness and firmness. This testing was performed with a Stable Micro Systems texture analyzer equipped with a 40 mm-width compression platen and 12 mm-depth well attachment.

One gram of protein crisp product was placed into the well below the compression platen before the platen was permitted to descend and compress the sample. Once a trigger force (set at 100 g in these tests) was reached, the analyzer recorded force, vertical distance, and time until measured force reached the set maximum (50 kg for these test.)

The foregoing was done 5 times for each sample.

Figure 2:
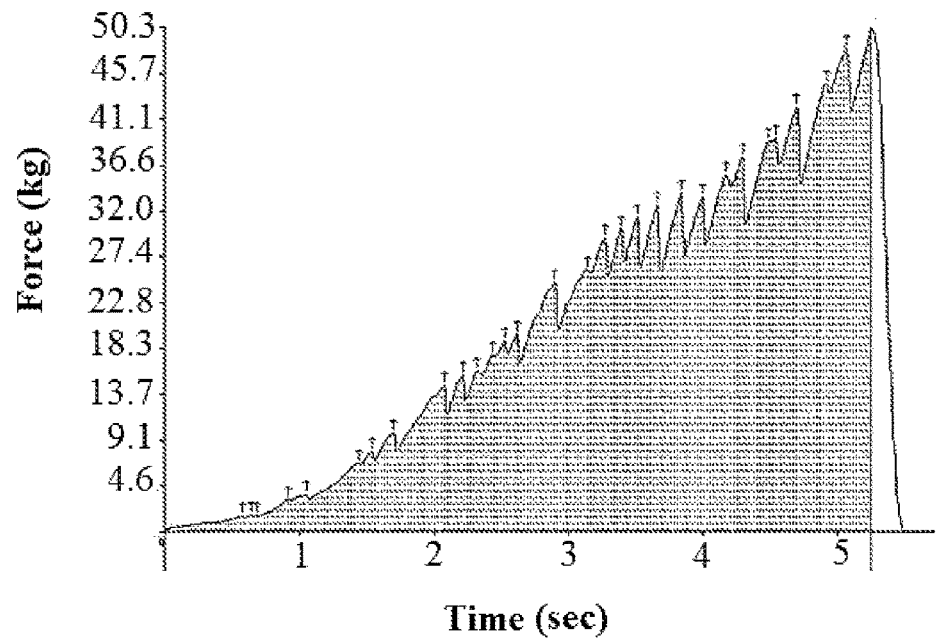
FIG. 2 is a plot of texture analyzer data (force versus time), showing ruptures of expanded starch cells in an exemplary crisp proteinaceous food product according to the present invention.

An exemplary output from one of these tests is shown in FIG. 2, where recorded force is plotted against time. Each jagged dip represents the breakthrough of an expanded starch cell of a crisp product, with the number of peaks per unit time being considered a measure of overall crispness, i.e., a crispier sample has more dips than a less crispy sample. The amount of time needed to reach the endpoint force, i.e., to compress the sample, is considered to be an indicator of the sample's firmness, with softer samples taking a longer amount of time to reach that target than a harder sample.

The number of dips from each of the collected runs was plotted against calculated bulk density. Standard regression analysis of the plotted data indicated no correlation between bulk density and crispness.

Firmness (in g/sec) also was plotted against calculated bulk density. Standard regression analysis of that plotted data indicated a significant correlation (both $R^2$ and $R^2$ (adjusted)≈80%).

Thus, the aforedescribed process is capable of providing a proteinaceous food product (crisp) having a higher degree of firmness than similar products made by previously available methods. This characteristic potentially opens the use of such food products in end-use applications where firmness is desirable, e.g., breakfast cereals and protein or nutrition bars.

That which is claimed is:

1. A proteinaceous food product, wherein the proteinaceous food product has a bulk density of 120 to 500 g/L, wherein the proteinaceous food product comprises water, starch, and proteins derived from dried egg white and at least one other protein source, wherein the proteins constitute 22.5 to 55 weight percent of the proteinaceous food product, wherein a majority of the proteins are derived from the dried egg white, and wherein the proteins comprise at least 33 weight percent of ovalbumin.

2. The proteinaceous food product of claim 1, the proteinaceous food product comprising at least 35 weight percent of the starch.

3. The proteinaceous food product of claim 1, wherein the dried egg white comprises egg white powder.

4. The proteinaceous food product of claim 1, wherein the proteinaceous food product comprises the dried egg white and the starch in a weight ratio of 2:3 to 3:2.

5. The proteinaceous food product of claim 4, wherein the proteinaceous food product comprises equal parts, by weight, of the dried egg white and the starch.

6. The proteinaceous food product of claim 1, wherein the food product comprises 30 to 72.5 weight percent of carbohydrates.

7. The proteinaceous food product of claim 1, wherein the proteins comprise at least 40 weight percent of the ovalbumin.

8. The proteinaceous food product of claim 7, wherein the proteins comprise at least 45 weight percent of the ovalbumin.

9. The proteinaceous food product of claim 1, wherein the bulk density is at least 200 g/L.

10. The proteinaceous food product of claim 9, wherein the bulk density is at least 250 g/L.

11. The proteinaceous food product of claim 10, wherein the bulk density is at least 300 g/L.

12. The proteinaceous food product of claim 1, wherein a 30 g serving size of the proteinaceous food product comprises at least 10 g of proteins.

13. The proteinaceous food product of claim 1, wherein the proteinaceous food product has a firmness of 4.6 kg/s to 10.1 kg/s when subjected to a trigger force of 100 g.

14. The proteinaceous food product of claim 1, wherein the starch is expanded starch.

15. The proteinaceous food product of claim 1, wherein the proteins are denatured proteins.

16. The proteinaceous food product of claim 1, wherein the proteins constitute 24 to 54 weight percent of the proteinaceous food product.

17. The proteinaceous food product of claim 1, wherein the proteins constitute 25 to 52.5 weight percent of the proteinaceous food product.

18. The proteinaceous food product of claim 1, wherein the proteins comprise at least 50 weight percent of the ovalbumin.

19. The proteinaceous food product of claim 1, wherein the proteins constitute 24 to 54 weight percent of the proteinaceous food product, and wherein the proteins comprise at least 40 weight percent of the ovalbumin.

20. The proteinaceous food product of claim 1, wherein the proteins constitute 24 to 54 weight percent of the proteinaceous food product, and wherein the proteins comprise at least 50 weight percent of the ovalbumin.

21. The proteinaceous food product of claim 1, wherein the proteins constitute 25 to 52.5 weight percent of the proteinaceous food product, and wherein the proteins comprise at least 40 weight percent of the ovalbumin.

22. The proteinaceous food product of claim 1, wherein the proteins constitute 25 to 52.5 weight percent of the proteinaceous food product, and wherein the proteins comprise at least 50 weight percent of the ovalbumin.

* * * * *